United States Patent [19]

Hara

[11] 4,195,931

[45] Apr. 1, 1980

[54] CLEAR AIR TURBULENCE DETECTOR

[75] Inventor: Elmer H. Hara, Ottawa, Canada

[73] Assignee: The United States of America as represented by the Secretary of the Army, Washington, D.C.

[21] Appl. No.: 907,063

[22] Filed: May 18, 1978

[51] Int. Cl.² .............................................. G01B 9/02
[52] U.S. Cl. .................................... 356/346; 356/352
[58] Field of Search ............................. 356/346, 352

[56] References Cited

U.S. PATENT DOCUMENTS 3,389,256  6/1968  Astheimer ........................... 356/346

OTHER PUBLICATIONS

Fiocco et al., "Frequency Spectrum of Laser Echos from Atmospheric Constituents and Determination of the Aerosol Content of Air", Jour. of the Atmospheric Sci., vol. 25, May 1968, pp. 488–496.

Primary Examiner—John K. Corbin
Assistant Examiner—Scott J. Sugarman
Attorney, Agent, or Firm—Nathan Edelberg; Jeremiah G. Murra; Edward Goldberg

[57] ABSTRACT

Method and apparatus is described for remote detection of location and intensity of clear air turbulence through the collection and analyses of back scattered laser light from a region where clear air turbulence may exist. The interference pattern of the collected light is determined through an ultra high resolution spectroscope and is analyzed with an image dissector. Information from the image dissector relating to the spectrum of back scattered light is correlated with the standard spectrum representing absence of clear air turbulence at the distance in question. By providing apparatus having high sensitivity and fast response, a device suitable for use in aircraft to detect clear air turbulence is provided.

10 Claims, 6 Drawing Figures

CLEAR AIR TURBULENCE DETECTOR

BACKGROUND OF THE INVENTION

This invention relates to a method and apparatus for detecting distance, direction and intensity of clear air turbulence. More particularly, the invention relates to the use of laser beams, and the analysis of back scattered light from a region where clear air turbulence may exist, to detect the location and intensity of clear air turbulence.

STATEMENT OF THE PRIOR ART

It is known to use coherent, quasi-monochromatic light sources, such as those obtained from laser devices, to perform a spectral analysis of light scattered by atmospheric constituents. In letters to the Editor appearing in "Nature", Volume 203, page 508 (Aug. 1, 1964) and Volume 203, page 1274–1275 (Sept. 19, 1964), R. T. H. Collis and Myron G. H. Ligda describe the use of experimental pulsed ruby lasers to obtain back scattering from "clear" atmosphere. They noted variations in signal intensity of the back scattered light, those variations fluctuating with time, and attributed the variations to variations in the particulate matter content, or aerosols, in the atmosphere. Their observations were said to demonstrate the ability of laser "radar" (Lidar) to detect discontinuities in the "clear" atmosphere remotely by reference to back scattering from particulate matter, although they admitted that considerable technological development was necessary as well as a better understanding of the nature of clear air turbulence for practical application of their observations.

Subsequently, an article entitled "Frequency Spectrum of Laser Echoes from Atmospheric Constituents and Determination of the Aerosol Content of Air", by G. Fiocco and J. B. DeWolf, published in "Journal of the Atmospheric Sciences", Volume 25, May, 1968, at page 488, described laboratory experiments in which the spectrum of scattered radiation from lasers was analyzed in order to provide a measurement of the aerosol component of the air (at page 492 et. seq.). In the described experiments, scattered light from a laser beam was observed with a receiving telescope located a particular distance and direction from a scattering volume. The collected light was collimated and then passed through a pressure-scanned Fabry-Perot interferometer. The free spectral range of the interferometer was determined to be 0.20 Å at 6328 Å. A photomultiplier was used to pick up the light passed by the interferometer and amplify the same. The amplified photoelectron pulses were counted and printed. To compare the radiated and scattered spectra of the laser beam, a rotating wheel with portions of the surface cut away was placed at the center of the scattering volume so that the telescope was presented at alternate count intervals with scattering from the medium and scattering from the flat wheel surface. The spectra of light scattered from air containing artificially produced dense fog were examined in this manner. Compared to the spectrum of light scattered from the wheel, the spectrum of light scattered from the air and fog was shown to be broadened. The broadening effect was attributed to a frequency shift which depends on the Doppler effect resulting from the random motion of the scatterers having zero average displacement. It was suggested by the authors that by observing the width of the aerosol spectral peak, an indication of the existence of clear air turbulence could be obtained, although no further explanation of the basis of this thinking or the apparatus or method required to so analyze the width of the aerosol spectral peak to determine the existence of clear air turbulence was provided. Indeed, an article by A. L. Cole, J. A. Jenney and G. M. McKee, DRB/DSIS, Accession No. 69-00549, dated Jan. 16, 1969, indicates that clear air turbulence detection with lasers was beyond the state of the art as of August, 1968.

Finally, in a paper entitled "Normal Brillouin Scattering in Compressed Gases", Journal of the Optical Society of America, Volume 56, No. 10, pages 1403–1405, October, 1966, the authors discuss Rayleigh scattering and Brillouin shifting of laser beam light from individual molecules of gases, producing a Doppler-broadened spectrum line. By passing light scattered at right angles to a laser beam illuminating the gas in a high pressure cell through a pressure-scanned Fabry-Perot interferometer and measuring the spectrum photoelectrically, a well-resolved Rayleigh-Brillouin triplet was obtained, each of the three components of the scattered light having the same half-width as the spectrum of the laser.

Collis and Ligda in their letter in "Nature", Volume 203, page 508, suggested that the intensity of the back scattered light showed discontinuities fluctuating with time. This suggests a time variation of the intensity of such back scattered light from a given volume in the atmosphere at a given distance, which means detection of clear air turbulence should be possible if the intensity distribution of the side bands of the back scattered laser light is examined and compared to the side bands of a normal atmospheric back scattered laser light. The side bands generated by the Raleigh-Brillouin scattering process would have a significantly different intensity distribution produced by clear air turbulence.

Heretofore, there has not been a device to permit remote detection of clear air turbulence used in association with aircraft. It is an object of the present invention to provide apparatus and a method to permit remote detection of the location and intensity of clear air turbulence through analysis of the spectrum of scattered laser light. It is a further object of the invention to provide apparatus of a small enough size and fast enough response to be used in aircraft for detection of clear air turbulence.

SUMMARY OF THE INVENTION

In accordance with the invention applicant has provided a method for detecting clear air turbulence which comprises projecting a pulsed laser beam in a volume where clear air turbulence may exist from which back scattered light is collected. The distance of the volume is determined by the time of observation after transmission of a specific laser pulse, similar to the manner in which a radar is used to determine the distance to an aircraft. The interference pattern of the collected light is analyzed to determine its spectrum and the spectrum of the collected light is compared with that of the known standard spectrum of light observed in the absence of clear air turbulence. Either Rayleigh-Brillouin scattering or Mie scattering associated with clear air turbulence may be so analyzed.

To detect the location and intensity of clear air turbulence using this method, a high peak power pulsed laser source such as a $Nd^{3+}$:YAlG is used to direct a laser beam at a volume where clear air turbulence may exist. An ultra high resolution spectroscope, preferably a Fabry-Perot interferometer which creates a circularly symmetric interference pattern, is used to pick up and analyze the back scattered light from the laser and thereby provide an interference pattern. An image dissector, associated with the spectroscope, receives and dissects the interference pattern from the spectroscope. A programmer unit provides a gating pulse to the image dissector so that the intensity of back scatter from a volume of air at a known distance is intermittently analyzed at the image dissector. This gating pulse is temporally coordinated with the laser pulse, to select a suitable distance of observation. The image dissector is preferably a photomultiplier controlled by the gating pulse generated in the programmer unit. A correlation computer receives the output from the image dissector and correlates the information of this output with the standard spectrum representing an absence of clear air turbulence. Indicator means are activated by the correlation computer when a significant departure from the standard spectrum exists, the indicator means showing the degree of departure from a standard spectrum.

BRIEF DESCRIPTION OF THE DRAWINGS

Other objects and advantages of the invention will become apparent upon reading the following detailed description and upon referring to the drawing in which.

While the invention will be described in connection with a preferred embodiment and procedure, it will be understood that it is not intended to limit the invention to that embodiment or procedure. On the contrary, it is intended to cover all alternatives, modifications and equivalents as may be included within the spirit and scope of the invention as defined by the appended claims.

DESCRIPTION OF THE PREFERRED EMBODIMENT

Figure 1:
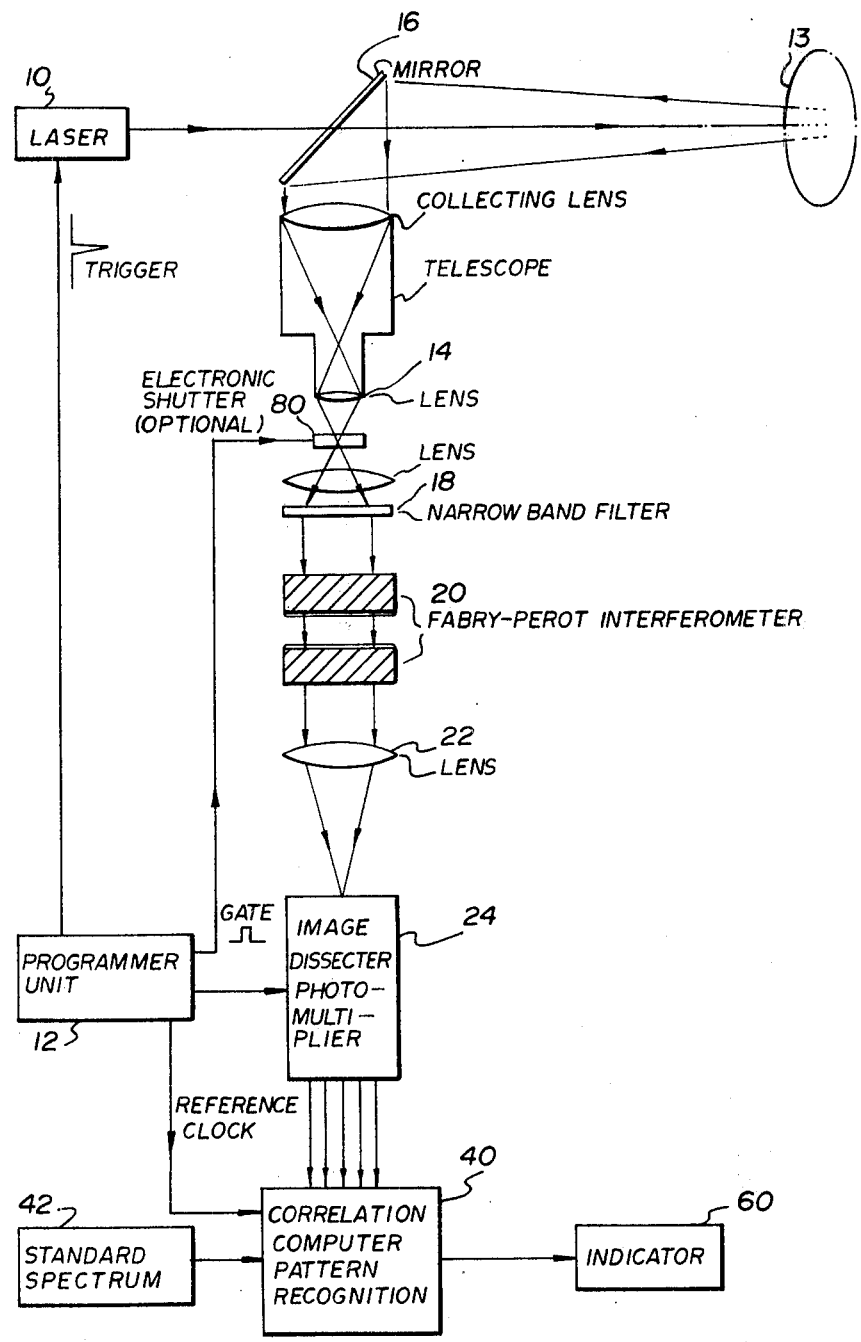
FIG. 1 is a schematic illustration of a clear air turbulence detection system according to the present invention.

Turning first to FIG. 1, there is shown a pulsed laser 10 used as a light source. Laser 10 is a high peak power pulsed laser triggered by programmer unit 12. As previously indicated, a suitable laser source is a $Nd^{3+}:YA1G$ laser which can provide a high peak pulse power and appropriate pulse repetition rate suitable for application in the present invention. For background information regarding this type of laser, see the paper of Joseph F. Geusic et al, "Coherent Optical Sources for Communications", Proc. IEEE, Volume 58, page 1434, October, 1970.

Back scattered light from volume of air 13 is directed into the collecting telescope 14 by mirror 16. Narrow band filter 18 blocks out ambient light.

Figure 2:
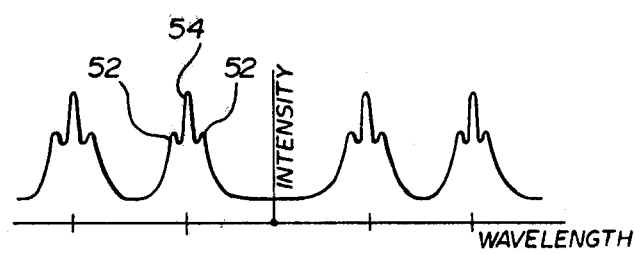
FIG. 2 is an illustration of a Fabry-Perot interferometer pattern of a type which might be obtained using apparatus according to the present invention.
Figure 3:
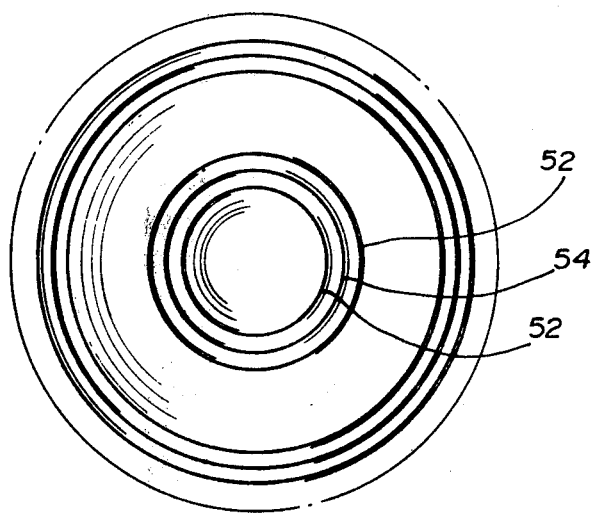
FIG. 3 is a graph showing the radial intensity distribution of the pattern according to FIG. 2.
Figure 4:
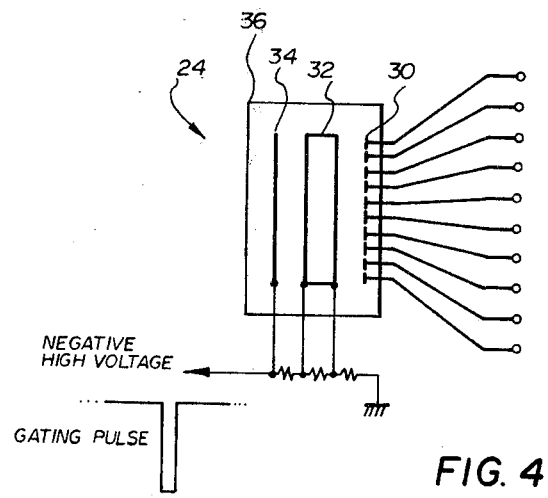
FIG. 4 is a schematic side cross-section view of an image dissector tube.

Light from telescope 14 and narrow band filter 18 is passed through a Fabry-Perot interferometer 20 which creates a circular symmetric interference pattern, as shown in FIGS. 2 and 3. This pattern is projected onto image dissector 24 through lens 22. Image dissector 24 is preferably a photomultiplier controlled by the programmer unit 12 by a gating pulse so that the intensity of back scatter from a volume of air at a known distance is intermittently analyzed. This permits determination of the distance of the volume of air for determining the location of the clear air turbulence. As an image dissector, a photomultiplier tube comprised of a photocathode, "Channeltron" (trademark) electron multiplier array and multiple anode structure in the form of concentric rings is used to provide the necessary sensitivity and spectrum analysis capability by parallel signal processing. The design of the photomultiplier is based on the existing technology developed by Bendix Research Laboratories of the Bendix Corp., Electro-Optics Division (c.f. P. J. Korwek, "Circuitry and Operation of the Bendix Photon Counting Tube Model BX754," Technical Applications Note 6802, Bendix Research Laboratories, Southfield, Mich., June 1968; W. G. Wolber, "The Choice of a Detector for an Airborne Laser Rangefinder", Technical Application Note 6801, Bendix Research Laboratories, Southfield, Mich., March 1968; "Bendix Chevron Microchannel Plate", data sheet; Bendix Research Laboratories, Southfield, Mich.; "Model 6025, 6040, 6075 Channeltron Electron Multiplier Array", data sheet, Bendix Research Laboratories, Southfield, Mich.). FIG. 4 shows a schematic diagram of the image dissector photomultiplier tube having concentric ring anodes 30, electron multiplier array 32, and photocathode 34 enclosed within glass envelope 36. The concentric rings of the anode have sufficiently fine widths to resolve the Fabry-Perot interferometer concentric ring pattern when it is imposed upon the photocathode. Consequently, many rings are required to obtain a high resolution. The axes of the interference pattern and concentric anode ring structure must be coincident for proper operation of the spectrometer, otherwise loss of resolution will be experienced. The construction of the spectrometer therefore should be mechanically rigid and the image dissector and Fabry-Perot interferometer must be fabricated into an integral unit. The conventional spectrum scanning technique of the Fabry-Perot is to make the interferometer ring pattern expand and contract by varying the interferometer etalon spacing (c.f. "New Tropel Modes 240", data sheet Tropel Inc., Fairport, N.Y.). A pinhole blocks out all except a small portion of the optical signal power which is detected by a suitable photodetector. In such a serial scanning technique, most of the optical signal power is wasted because the pinhole blocks out most of the power. The invention presented here utilizes all of the optic signal power because the entire interference pattern is detected simultaneously and the resultant electrical signal is presented as an output at the multiple anodes in parallel at the same time. We can therefore expect shorter time requirements for spectrum analysis in comparison to the conventional serial scanning method by processing the data in parallel with suitable electronic computers such as microprocessors which employ digital methods.

The programmer provides appropriately timed trigger, gating and reference clock pulses to the laser, image dissector photomultiplier and correlation computer respectively. The timing relation of the trigger and gating pulses are such that the back-scattered light from the desired volume of air at a given distance is detected. The reference clock pulses are used by the correlation computer to govern the rate of analysis for the detection of clear air turbulence.

The correlation computer may be adapted to detect either Mie scattering, which has a characteristic spectrum associated with clear air turbulence, or the change in the Rayleigh-Brillouin scattered light spectrum associated with clear air turbulence. In FIG. 2, a typical circularly symmetric Rayleigh-Brillouin spectrum from a Fabry-Perot interferometer is shown, with Brillouin doublets 52 beside a central Rayleigh peak 54.

Figure 5:
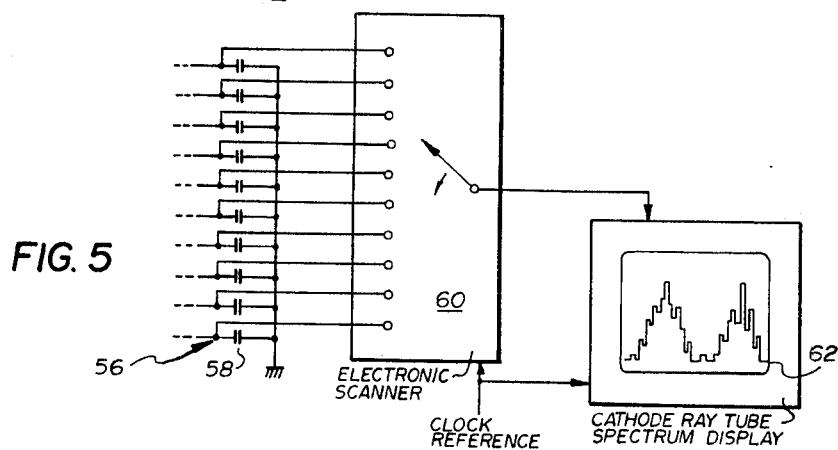
FIG. 5 is an analogue display of the observed spectrum using a device according to the present invention.

As an example, a simple use of the image dissector output as a clear air turbulence detector is described in FIG. 5. The outputs 56 from the multiple anodes 30 are connected to capacitors 58 which store the signal (electronic charge) until it is sampled by the electronic scanner 60 which may be a commercial analogue multiplexer unit (c.f. for example "16 channel Analog Multiplexer Modes MM16" (trademark), data sheet, Datel Systems Inc., Canton, Mass.). Since the capacitors store the signal until sampled, full use of the received information is made. The serialized information which reproduces the radial intensity distribution of the interferometer is displayed on a cathode ray tube 62 (CRT) and presented to an operator. With actual flight experience, the operator will learn to recognize dynamic variations in the displayed spectrum that represent the presence of clear air turbulence. In effect, the operator performs the function of the correlation computer which is programmed to recognize significant patterns. The use of some electronic signal processing in between the scanner and the CRT is not excluded from the scope of the present invention. The signal to noise ratio can be improved and the detection of clear air turbulence enhanced by suitably combining by electronic means the repeated groups of spectral line shapes, typical of Fabry-Perot interferometers, to obtain a single averaged group.

Figure 6:
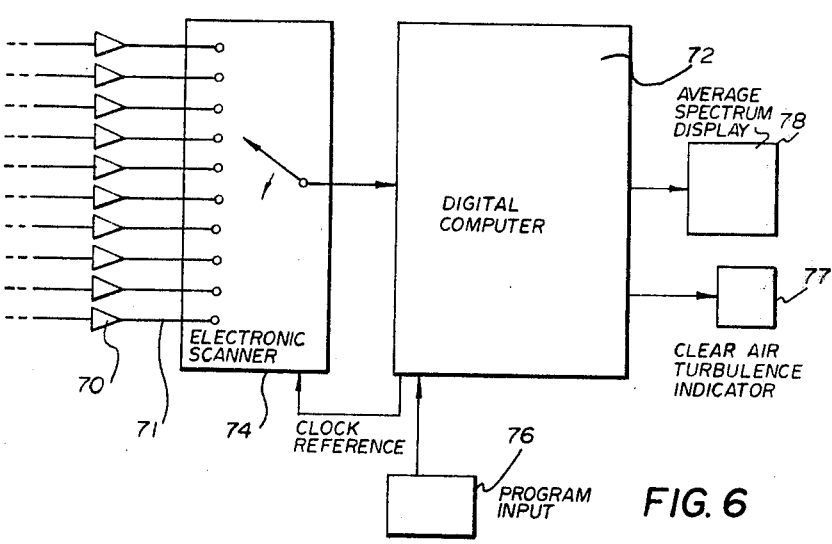
FIG. 6 is a schematic view of digital data processing means according to the present invention.

As a second example, FIG. 6 shows a block diagram of a digital data processing system for the correlation computer 40. Due to the nature of the photo-electric effect, the signal arriving at the anode is a series of pulses and the pulse rate is proportional to the light intensity. By connecting the output from the anodes to electronic pulse counters 70, we accomplish photon-counting and digitize the spectroscopic information at 71. The digital information is now readily subjected to analysis in a digital computer 72. Connection to the digital computer can be accomplished through an electronic scanner 74 which may be a commercial unit such as a high speed serializer (c.f. "High Speed Data Serializer MC2335" data sheets, Micro Consultants Ltd., England). Various programs can be provided to the computer at 76 to enhance the detection of clear air turbulence through indicator 77. The standard spectrum data for reference comparison is also provided through the program input 76. Averaging of the repeated groups of spectral lines, typical of Fabry-Perot interferometers, into a single group at 78 will improve the signal to noise ratio and enhance the detection of clear air turbulence. As a further improvement, an electronic shutter shown as an optical element 80 in FIG. 1 can be used to improve the signal to noise ratio of the spectrometer. By briefly closing the electronic shutter in between the brief times of observation of the back scattered light in order to block off the ambient light, and by activitating the image dissector photomultiplier at the same time with a gating pulse identical to that used for observing the back scattered light, we obtain digital information on the inherent noise generated within the spectrometer. This digital data can then be subtracted from the following digital data on the back scattered light and thereby improve the signal to noise ratio. The procedure is in effect equivalent to phase sensitive detection, a method which improves detectability of a signal manyfold. If the digital computer has parallel computational capability, the electronic scanner can be bypassed and a fully parallel processing system constructed. Of course the software (program) can be changed to optimize the possibility of detecting clear air turbulence.

Thus, using apparatus of the type described with ultra high resolution spectra being achieved through the Fabry-Perot interferometer and pattern recognition by a correlation computer, the variation from normal of the Rayleigh-Brillouin or the Mie scattered light spectrum associated with clear air turbulence is readily determined. Any significant departure from the standard spectrum causes an indicator to be activated and provide appropriate readings for clear air turbulence location and intensity.

Thus it is apparent there has been provided in accordance with the invention, a method and apparatus which will permit remote detection of clear air turbulence that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. Apparatus for remote detection of the location and intensity of clear air turbulence comprising:
   (a) a high peak power pulsed laser source to direct a laser beam at a region where clear air turbulence may exist which causes back scattering of light from said beam;
   (b) an ultra high resolution Fabry-Perot interferometer to pick up the back scattered light and provide a circularly symmetric interference pattern characteristic of said light;
   (c) an image dissector having a plurality of concentric ring anodes with parallel output electrodes to receive and analyze said circularly symmetric interference pattern to determine the spectrum of said light;
   (d) reference means providing a time reference for measuring distance to said region and a standard spectrum for comparison with said back scattered light;
   (e) correlation means receiving the output from said image dissector for comparison with said standard spectrum representing an absence of clear air turbulence; and
   (f) means activated by said correlation means for indicating the occurrence of a significant departure from the standard spectrum.

2. Apparatus according to claim 1 wherein the laser source is a $Nd^{3+}:YAlG$ laser.

3. Apparatus according to claim 1 wherein said high resolution Fabry-Perot interferometer is capable of providing an interference pattern representing the intensity distribution of the sidebands of the back scattered light, said image dissector concentric ring anodes receiving and analyzing said side bands, and said correlation means comparing said side bands of said back scattered light with side bands of said standard spectrum.

4. Apparatus according to claim 1, wherein said reference means includes a programmer unit to provide a gating pulse to said image dissector so that the intensity of back scatter from said region is intermittently analyzed at the image dissector, the gating pulse being synchronized with the laser pulse to establish the time of observation and distance to said region, and said image dissector includes a photomultiplier controlled by the gating pulse generated in the programmer unit.

5. Apparatus according to claim 1, including a collecting telescope directing said back scattered light toward said interferometer.

6. Apparatus according to claim 4, wherein said photomultiplier comprises a channel electron multiplier to improve the sensitivity of the image dissector, and said plurality of parallel anodes provides parallel data processing for fast response.

7. Apparatus according to claim 1, wherein photon counting instrumentation is associated with the image dissector.

8. A method of detecting clear air turbulence comprising;

(a) projecting a pulsed laser beam in a region where clear air turbulence may exist which causes back scattering of light from said beam;

(b) collecting the back scattered light to provide a circularly symmetrical interference pattern;

(c) determining the distance of the region from which the back scattered light is received by observing said light at a specific time after the transmission of a laser pulse;

(d) analyzing the entire circularly symmetrical interference pattern substantially simultaneously by providing a plurality of parallel output signals to determine the spectrum of the collected light; and (e) comparing the spectrum of the collected light with that of a known spectrum standard of light observed in the absence of clear air turbulence.

9. The method according to claim 8, wherein the interference pattern has a characteristic Rayleigh-Brillouin scattered light spectrum including the intensity distribution of the side bands of the back scattered light associated with clear air turbulence which is analyzed to detect clear air turbulence.

10. The method according to claim 8, wherein the interference pattern has a characteristic Mie scattered light spectrum including the intensity distribution of the side bands of the back scattered light associated with clear air turbulence which is analyzed to detect clear air turbulence.

* * * * *

UNITED STATES PATENT AND TRADEMARK OFFICE
CERTIFICATE OF CORRECTION

PATENT NO. : 4,195,931
DATED : April 1, 1980
INVENTOR(S) : Elmer H. Hara

It is certified that error appears in the above–identified patent and that said Letters Patent are hereby corrected as shown below:

On the title page:

Item [73] should read as follows:

Assignee: Her Majesty the Queen in right of Canada, as represented by the Minister of National Defence, Ottawa, Ontario.

Signed and Sealed this

Ninth Day of September 1980

[SEAL]

Attest:

SIDNEY A. DIAMOND

Attesting Officer　　Commissioner of Patents and Trademarks